(12) United States Patent
Buchmann et al.

(10) Patent No.: US 11,106,069 B2
(45) Date of Patent: Aug. 31, 2021

(54) VEHICLE WINDOW PANE HAVING A COMPOSITE COMPRISING A LIQUID CRYSTAL ARRANGEMENT

(71) Applicant: Webasto SE, Stockdorf (DE)

(72) Inventors: Max Buchmann, Munich (DE); Jonas Dietrich, Stockdorf (DE); Steffen Lorenz, Stockdorf (DE); Daniela Baierl, Stockdorf (DE); Sascha Dietrich, Stockdorf (DE); Daniel Brose, Stockdorf (DE); Seongmin Lee, Daejeon (KR); Byoung Kun Jeon, Daejeon (KR)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/642,310

(22) PCT Filed: Dec. 20, 2018

(86) PCT No.: PCT/EP2018/086373
§ 371 (c)(1),
(2) Date: Feb. 26, 2020

(87) PCT Pub. No.: WO2020/126011
PCT Pub. Date: Jun. 25, 2020

(65) Prior Publication Data
US 2021/0146660 A1 May 20, 2021

(51) Int. Cl.
*B32B 17/10* (2006.01)
*G02F 1/1333* (2006.01)
*G02F 1/1335* (2006.01)

(52) U.S. Cl.
CPC .. *G02F 1/133371* (2013.01); *B32B 17/10036* (2013.01); *B32B 17/10504* (2013.01);
(Continued)

(58) Field of Classification Search
CPC ........... G02F 1/133331; G02F 2202/28; G02F 1/133528; G02B 5/3025; B32B 17/10504; B32B 17/10036; B32B 2605/006
See application file for complete search history.

(56) References Cited

U.S. PATENT DOCUMENTS 6,764,614 B2 7/2004 Penterman et al.
2004/0008297 A1 1/2004 Ozeki
(Continued)

FOREIGN PATENT DOCUMENTS

WO 2018233990 A1 12/2018

OTHER PUBLICATIONS

International Search Report for PCT/EP2018/086373 in German (4 pages).
(Continued)

*Primary Examiner* — Jia X Pan
(74) *Attorney, Agent, or Firm* — Fitch, Even, Tabin & Flannery, LLP

(57) ABSTRACT

A vehicle window pane having a plate-like window pane body which has an outer side which faces the surroundings of the vehicle and an inner side which faces away from the outer side and to which a composite is connected, the composite having a layer structure which may have multiple layers disposed one on top of the other, one of the layers having a liquid crystal arrangement having two films and a liquid crystal cell disposed between the two films, and another one of the layers being a polarizer layer. At least one layer of the layer structure can be a compensation layer whose area is smaller than the area of the liquid crystal arrangement, the liquid crystal cell thus having an edge portion which is thicker than a central portion covered by the compensation layer.

15 Claims, 14 Drawing Sheets

(52) U.S. Cl.
CPC .. *G02F 1/133302* (2021.01); *G02F 1/133528* (2013.01); *B32B 2605/006* (2013.01); *G02F 2202/28* (2013.01)

(56) References Cited

U.S. PATENT DOCUMENTS

| | | | |
|---|---|---|---|
| 2014/0141192 A1* | 5/2014 | Fernando | B32B 27/36 428/76 |
| 2014/0176836 A1* | 6/2014 | Brecht | G02F 1/133553 349/16 |
| 2015/0124188 A1* | 5/2015 | Kadowaki | G02F 1/133514 349/42 |

OTHER PUBLICATIONS

English translation of the Written Opinion of the International Searching Authority for PCT/EP2018/086373 (5 pages).

Written Opinion of the International Searching Authority for PCT/EP2018/086373 with English translation submitted herewith (10 pages).

\* cited by examiner

VEHICLE WINDOW PANE HAVING A COMPOSITE COMPRISING A LIQUID CRYSTAL ARRANGEMENT

CROSS-REFERENCE TO RELATED APPLICATIONS

This application is a U.S. national phase application filed under 35 U.S.C. § 371 of International Application No. PCT/EP2018/086373, filed Dec. 20, 2018, designating the United States, which is hereby incorporated herein by reference in their entirety for all purposes.

FIELD

The invention relates to a vehicle window pane having the features of the preamble of claim 1.

BACKGROUND

A vehicle window pane of this kind is known from practice and may be a displaceable or fixed roof element of a motor vehicle. The vehicle window pane comprises a plate-like window pane body, which is typically made of glass and forms an outer skin of the roof element. At its inner side, the window pane body is provided with a composite structure which comprises, as a functional layer, a liquid crystal arrangement which can be electrically switched, thereby defining the translucency of the vehicle window pane. Depending of the switch state of the liquid crystal arrangement, the vehicle window pane is either largely translucent or largely opaque, thus forming a shading arrangement.

Moreover, it is known for a polarizer layer to be employed as another functional layer in a vehicle window pane of the kind described above. The polarizer layer has the same dimensions as the liquid crystal arrangement in the transverse direction of the window pane. Furthermore, the composite has intermediate lamination layers which establish the connection between the functional layers and the connection to the window pane body. The intermediate lamination layers have a size that extends at least across the liquid crystal arrangement.

During production of the vehicle window pane described above, following a lamination process, in which the composite is exposed to defined pressures and temperatures, thermal expansion of the liquid crystal cell and inhomogeneities in the materials used may lead to optical defects in the liquid crystal cell which are due to local concentrations of the material of the liquid crystal cell and which are referred to as dark spots. They can also form in the visible area of the vehicle window pane, which affects the appearance of the vehicle window pane.

SUMMARY

The object of the invention is to provide a vehicle window pane of the kind mentioned above in which the risk of formation of local concentrations of the substance of the liquid crystal cell in the visible area of the vehicle window pane is minimized.

According to the invention, this object is attained by the vehicle window pane having the features of claim 1.

The invention proposes a vehicle window pane which comprises a plate-like window pane body which has an outer side which faces the surroundings of the vehicle and an inner side which faces away from the outer side and to which a composite is connected, the composite having a layer structure which comprises multiple layers disposed one on top of the other, one of the layers comprising a liquid crystal arrangement which comprises two films and a liquid crystal cell disposed between the two films, and another layer being a polarizer layer. At least one layer of the layer structure is a displacement layer whose area is smaller than the area of the liquid crystal arrangement, the liquid crystal cell thus having an edge portion which is thicker than a central portion covered by the displacement layer.

With the displacement layer, concentration of the material of the liquid crystal cell in the edge portion is achieved in a targeted manner, allowing optical defects or dark spots to be shifted to said edge portion, which is preferably located outside of the visible area. This means that a liquid crystal reservoir forms in the edge portion of the liquid crystal cell. This is made possible by the fact that during production of the composite, the displacement layer is laterally limited by an empty area which overlaps with the respective edge portions of the liquid crystal cell. The pressure that is exerted on the edge portion of the liquid crystal arrangement is lower than the pressure in the central portion, which causes the material of the liquid crystal cell to accumulate and thicken in the edge portion.

The displacement layer can be configured in different ways. For example, the displacement layer is formed by the polarizer layer, in which case the polarizer layer has a smaller area than the liquid crystal arrangement and is laterally delimited by an empty area in the composite.

In an alternative embodiment of the vehicle window pane according to the invention, the displacement layer is formed by an additional layer, in particular by an additional film. The additional layer can be disposed in different places in the composite. For example, the additional layer is adjacent to the liquid crystal arrangement or to the polarizer layer. The additional layer may also be disposed between the liquid crystal arrangement and the polarizer layer or between the plate-like window pane body and the liquid crystal arrangement if the polarizer layer is disposed on the side of the liquid crystal arrangement that faces away from the window pane body.

In a preferred embodiment of the vehicle window pane according to the invention, the additional layer has a thickness between 10 μm and 500 μm. This thickness is sufficient to achieve thickening of the liquid crystal cell in the edge portion. At the same time, however, the total thickness of the vehicle window pane is not significantly increased.

Furthermore, the vehicle window pane according to the invention may have a glass inner body on its inner side, the glass body being glued to the layer structure. In this case, the additional layer may also be adjacent to the glass inner body.

The layer structure of the composite is preferably connected to the window pane body by means of an adhesive layer, such as an adhesive film.

Furthermore, the layer structure may comprise an adhesive layer between the liquid crystal arrangement and the polarizer layer. This adhesive layer may also be formed by an adhesive film.

The adhesive layers mentioned above may each generally be made of an acrylate layer, a layer of thermoplastic polyurethane, an epoxy layer, a silicone layer, a polyethylene layer or of a layer of a cross-linking material, such as ethylene-vinyl acetate (EVA) or polyvinyl butyral (PVB).

Likewise, the additional layer causing the material of the liquid crystal cell to accumulate in the edge portion of the liquid crystal cell may be made of an acrylate layer, a layer of thermoplastic polyurethane, an epoxy layer, a silicone layer, a polyethylene layer or of a layer of a cross-linking material, such as ethylene-vinyl acetate (EVA) or polyvinyl butyral (PVB).

The edge portion of the liquid crystal arrangement, which is not covered by the displacement layer, preferably has a width between 5 mm and 40 mm.

Moreover, the liquid crystal arrangement may be protected against environmental conditions by an edge sealing, which delimits a circumferential edge of the layer structure. The edge sealing may consist of a film structure whose materials may be the same as the materials of the additional layer and of the adhesive layer mentioned above.

The window pane body of the vehicle window pane according to the invention may have a three-dimensional curvature. For example, the window pane body may have curvatures in two directions, i.e., along a transverse direction and along a longitudinal direction of a vehicle in the case of a roof window pane, said curvatures each having a curvature radius between 1,000 mm and 10,000 mm, preferably between 2,000 mm and 5,000 mm, which may change in the course of the curvature, i.e., does not have to be constant in the direction in question.

The liquid crystal arrangement of the vehicle window pane according to the invention may be operated with short switching times of about a second across a wide temperature range. Additionally, a low voltage may be enough to actuate the liquid crystal arrangement. The voltage, which is an alternating voltage, may be below 30 V in particular. The frequency of the alternating voltage is 60 Hz, for example, but may also be higher depending on the desired speed of alignment of the liquid crystals and may be up to 100 to 120 Hz or also lower.

Furthermore, when switched off, the liquid crystal arrangement offers a very low transmission, which may be blow 1% for visible light. The color of the liquid crystal arrangement is gray, for example, but may be customized by admixing dyes.

In particular, the vehicle window pane according to the invention is a roof element of the vehicle in question. The roof element may be a fixed roof element which is rigidly connected to the body of the vehicle in question or a movable roof element which forms a lid element of a sunroof arrangement.

The window pane inner body with which the vehicle window pane according to the invention may be provided may be configured in the same way as the window pane body and consist of a glass having a thickness of about 1.5 mm to 2.6 mm, for example. In a specific embodiment of the vehicle window pane according to the invention, the window pane inner body is formed by thin glass, which is flexible and thus can be adapted to a potential curvature of the plate-like window pane body. The thin glass, which may be a chemically pre-stressed glass, has a thickness between 0.1 mm and 1.5 mm, for example.

The polarizer layer of the vehicle window pane according to the invention preferably has a polarization direction that is oriented at a right angle to a polarization direction of the liquid crystal cell when switched off. In that case, the switched-on state is associated with the transmission state. However, the polarization direction of the polarizer layer may also be parallel to the polarization direction of the liquid crystal cell when the liquid crystal cell is switched off, which means that the arrangement as a whole is in the transmission state in that case.

The displacement layer, if realized as an additional layer in particular, preferably has a refractive index which corresponds to the refractive index of the films of the liquid crystal arrangement. In this way, multiple refraction of the light during passage through the vehicle window pane can be counteracted at least to some degree.

In a preferred embodiment of the vehicle window pane according to the invention, the liquid crystal arrangement comprises a single liquid crystal cell which extends at least largely across the entire liquid crystal arrangement and covers the potential visible area of the vehicle window pane.

A specific embodiment of the vehicle window pane according to the invention additionally comprises a light guide layer which can be or is connected to a light source via its edge. The light guide layer, which may be integrated together with the composite comprising the liquid crystal arrangement in a one-stage process during production of the vehicle window pane, may constitute a lighting system for the interior of the vehicle in question. In particular, the light guide layer may be part of what is known as an ambient lighting system of the vehicle in question. That is, in this embodiment, the functions of the switchable liquid crystal arrangement and the functions of a surface lighting system, an ambient lighting system in particular, are combined. Advantageously, the light guide layer and the liquid crystal arrangement can be controlled separately and independently, i.e., are switchable in such a manner that the liquid crystal arrangement goes into its transmission state or into its blocking state and the light guide layer is illuminated or not illuminated.

The light guide layer is preferably disposed on the side of the vehicle window pane that faces away from the surroundings of the vehicle, which means that the light guide layer is visible from the interior of the vehicle in question when it is activated, irrespective of the switch state of the liquid crystal arrangement.

The light guide layer, which may be curved and form an inner visible surface of the vehicle window pane, may be made of any suitable materials. In particular, the light guide layer may comprise a planar glass body which may also form the window pane inner body of the vehicle window pane.

In an alternative embodiment of the vehicle window pane according to the invention, the light guide layer may comprise a plastic film and/or a plastic plate. This is advantageous in particular if the vehicle window pane is to be weight-optimized.

In order to realize specific lighting properties, the light guide layer may have scattering centers, which are formed by nanoparticles in particular, and may have a print and/or a refractive layer.

Other advantages and advantageous embodiments of the subject-matter of the invention are apparent from the description, the drawing, and the claims.

Embodiments of a vehicle window pane according to the invention are illustrated in a schematically simplified manner in the drawing and will be explained in more detail in the following description.

BRIEF DESCRIPTIONS OF THE DRAWINGS

DETAILED DESCRIPTION

Figure 1:
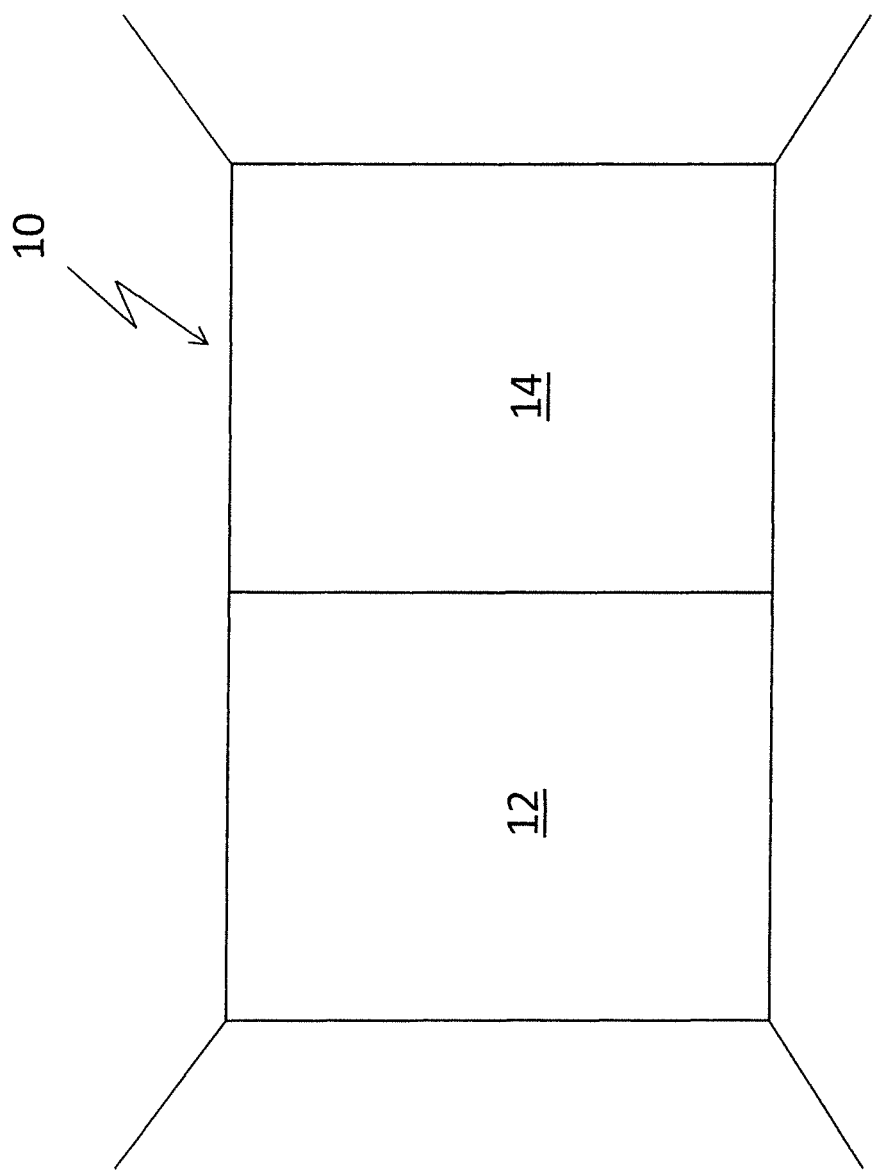
FIG. 1 is a plan view of a vehicle roof having a vehicle window pane according to the invention.

FIG. 1 shows a vehicle roof 10 of a motor vehicle (not shown in detail). Vehicle roof 10 is a panoramic sunroof, which is provided with a displaceable lid element 12 and a fixed roof element 14, which is immobile relative to the vehicle body. Lid element 12 and fixed roof element 14 are each realized as a glass element and thus each form a vehicle window pane. Moreover, lid element 12 and fixed roof element 14 each have the same layer structure, which is provided with a shading arrangement and illustrated in detail in FIG. 2.

Roof elements 12 and 14, which each form a vehicle window pane, each comprise a window pane body 16 made of a glass plate which is curved in a longitudinal direction and in a transverse direction of the roof and which foil is the outer skin of the vehicle window pane in question, the outer skin being exposed to the surroundings of the vehicle. At the inner side, each vehicle window pane comprises a window pane inner body 18, which is also made of a curved glass plate. Window pane body 16 and window pane inner body 18 each have a thickness of about 2.0 mm.

A composite 20, which is connected to window pane body 16 via a TPU adhesive film 22 and to window pane inner body 18 via a TPU adhesive film 24, is disposed between window pane body 16 and window pane inner body 18. Moreover, composite 20 comprises a shading arrangement 26, which is formed by a liquid crystal arrangement 28 and a polarizer layer 30. Liquid crystal arrangement 28 comprises two transparent films 32 and 34 of PET or polycarbonate, between which a single liquid crystal cell 36 is disposed. The two transparent films 32 and 34 each have a thickness of about 100 µm. In order to be able to switch liquid crystal cell 36 between a transmission state and a blocking state, conductive layers are integrated in liquid crystal arrangement 28 on the inner sides of films 32 and 34, the conductive layers being connected to an onboard electrical system of the vehicle in question via corresponding contacts (not shown). Respective alignment layers are preferably disposed on the conductive layers, the alignment layers delimiting liquid crystal cell 26. The alignment layers serve to pre-align the crystals of liquid crystal cell 26 in the switched-off state and may each be made of a polyimide or a UV-curing acrylate.

An adhesive layer 38 made of TPU is disposed between polarizer layer 30 and liquid crystal arrangement 28.

An additional layer 40 is connected to liquid crystal arrangement 28 on the side facing away from window pane body 16, the side of additional layer 40 that faces away from window pane body 16 being adjacent to adhesive film 24 and forming a displacement layer. Additional layer 40 is an additional film, which is made of thermoplastic polyurethane (TPU) and has a thickness of about 100 µm. As can be seen further in FIG. 2, additional layer 40 has an area that is smaller than the areas of liquid crystal arrangement 28, polarizer layer 30, adhesive films 22 and 24 and adhesive layer 38. Thus, a circumferential empty space 42 is formed below a circumferential edge portion of liquid crystal arrangement 28 during joining of composite 20, circumferential empty space 42 having the effect that the pressure exerted on liquid crystal arrangement 28 by additional layer 40 causes liquid crystal cell 36 to be thicker in the edge portion disposed above empty space 42 than in a central portion covered by additional layer 40. This means that a liquid crystal reservoir 44 forms in the edge portions of liquid crystal cell 36 because the liquid crystal material accumulates there. Empty space 42 has a width of about 30 mm and is located outside of the transparent area of the vehicle window pane.

Furthermore, the vehicle window pane is provided with an edge sealing 46 which protects liquid crystal arrangement 28 and composite 20 against environmental conditions.

After a lamination process for producing the vehicle window pane, empty space 42 may be filled at least partially by the material of adhesive film 24 and, if present, additional layer 40 as a result of the pressures and temperatures acting during that process.

Figure 2:
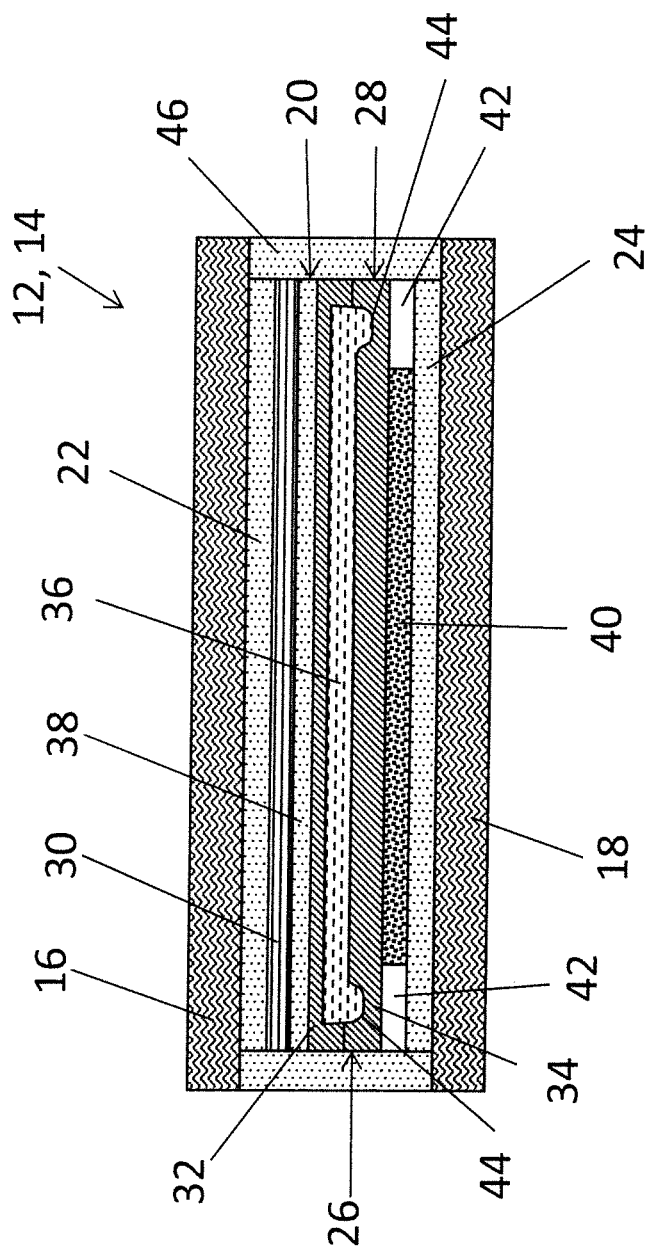
FIG. 2 is a section through the vehicle window pane showing the layer structure of the vehicle window pane.
Figure 3:
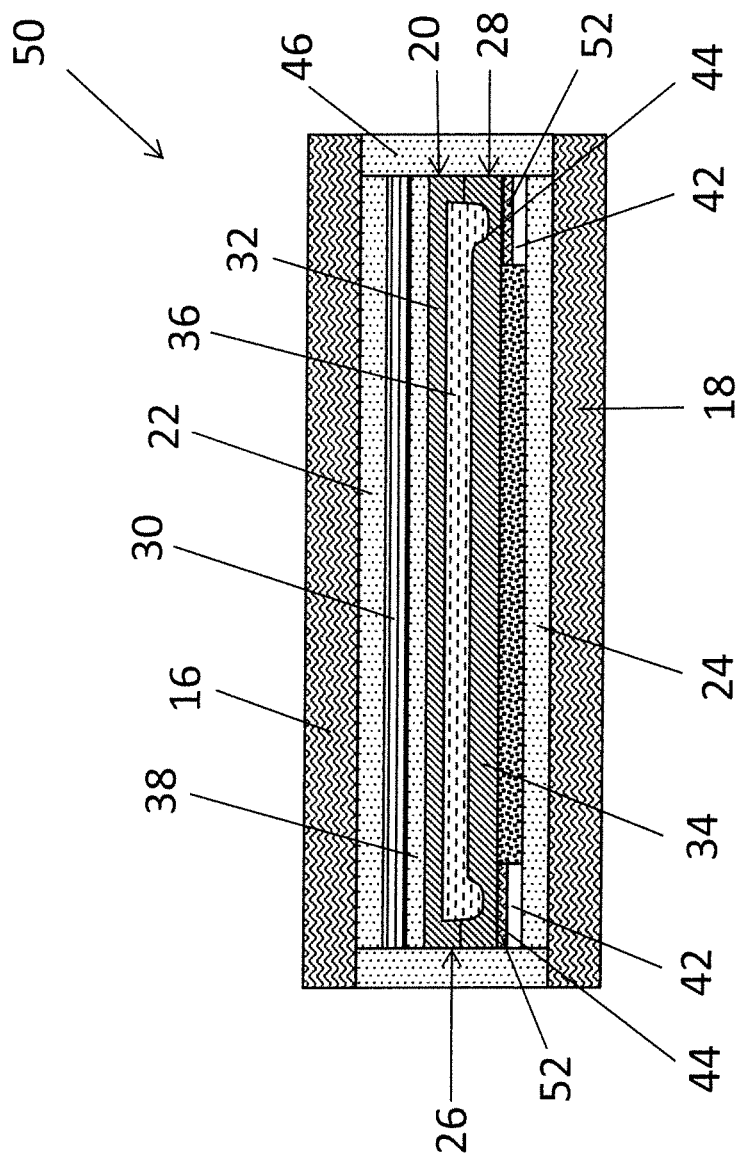
FIG. 3 is a section through a second embodiment of a vehicle window pane.

FIG. 3 shows an alternative embodiment of a window pane arrangement 50, which substantially corresponds to the window pane arrangement of FIG. 2, but differs from it in that a decoupling layer 52 is connected to lower film 34 of liquid crystal arrangement 28 in the area of empty space 42, decoupling layer 52 having the task of preventing the polyurethane of adhesive film 24 from adhering to liquid crystal arrangement 28.

Otherwise, window pane arrangement 50 corresponds to the window pane arrangement of FIG. 2.

Figure 4:
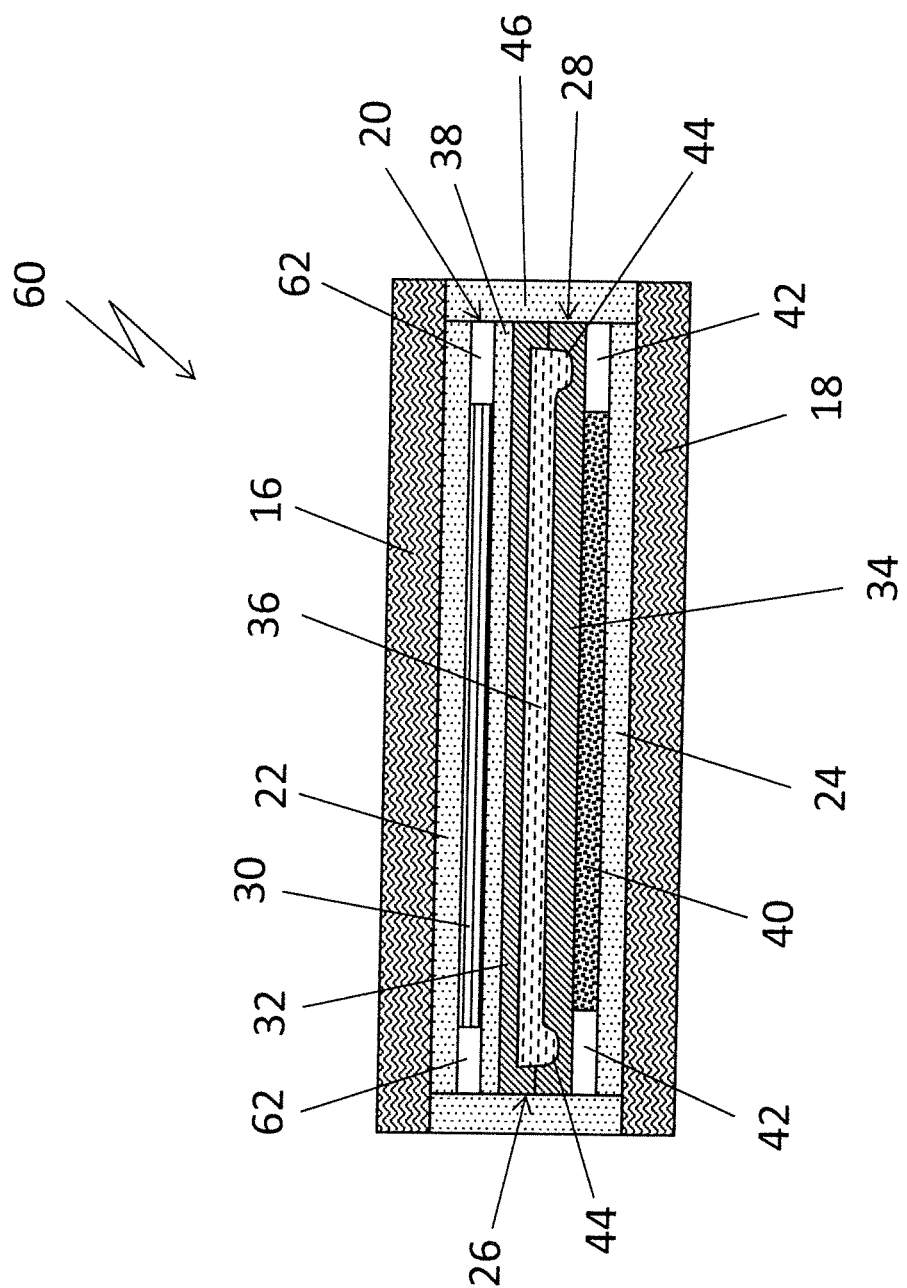
FIG. 4 is a section through a third embodiment of a vehicle window pane.

FIG. 4 shows a window pane arrangement 60, which again corresponds largely to the window pane arrangement of FIG. 2 but differs from it in that polarizer layer 30 has an area or dimensions corresponding to the dimensions of additional layer 40. Thus, polarizer layer 30 is also surrounded by an empty space 62, which means that polarizer layer 30 also acts as a displacement layer and that liquid crystal reservoir 44 forms in the edge portion of liquid crystal cell 36.

Figure 5:
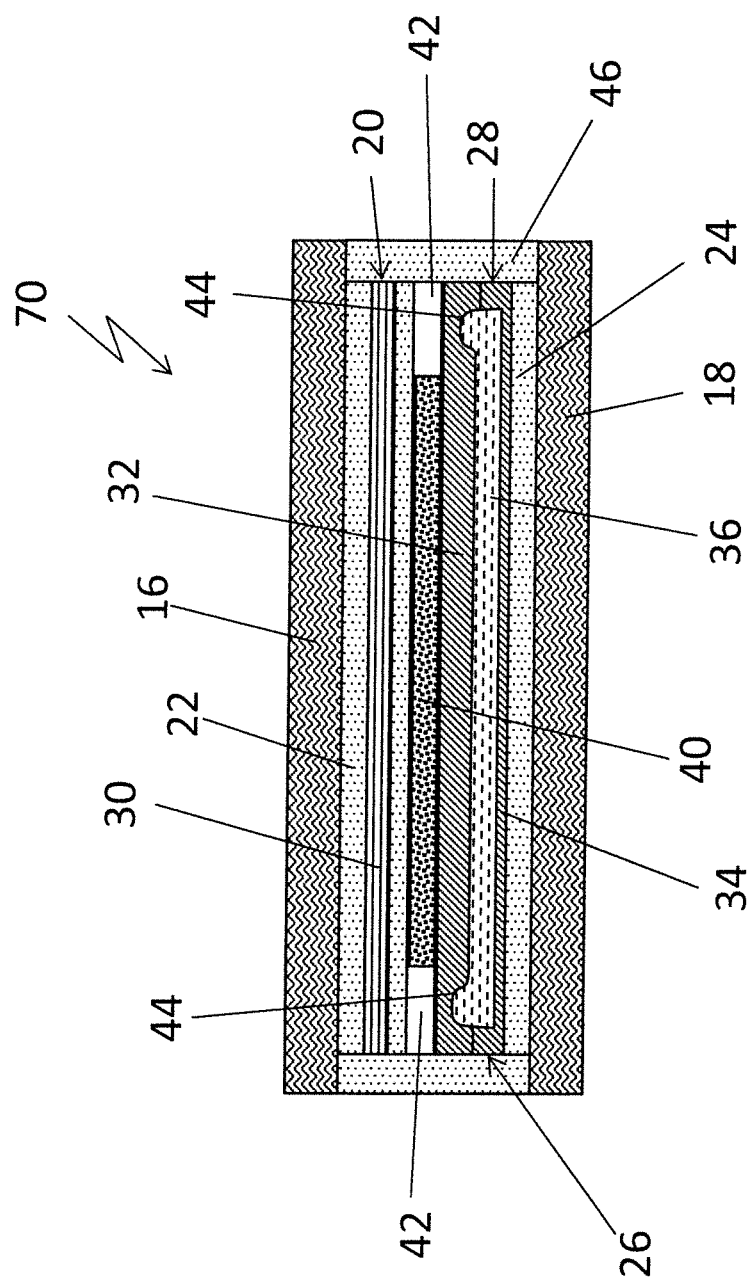
FIG. 5 is a section through a fourth embodiment of a vehicle window pane.

FIG. 5 shows another embodiment of a window pane arrangement 70, which substantially corresponds to the window pane arrangement of FIG. 2 but differs from it in that additional layer 40, which forms a displacement layer, is disposed on top of liquid crystal arrangement 28. That is, additional layer 40 is disposed between polarizer layer 30 and liquid crystal arrangement 28. Otherwise, window pane arrangement 70 corresponds to the window pane arrangement of FIG. 2.

Figure 6:
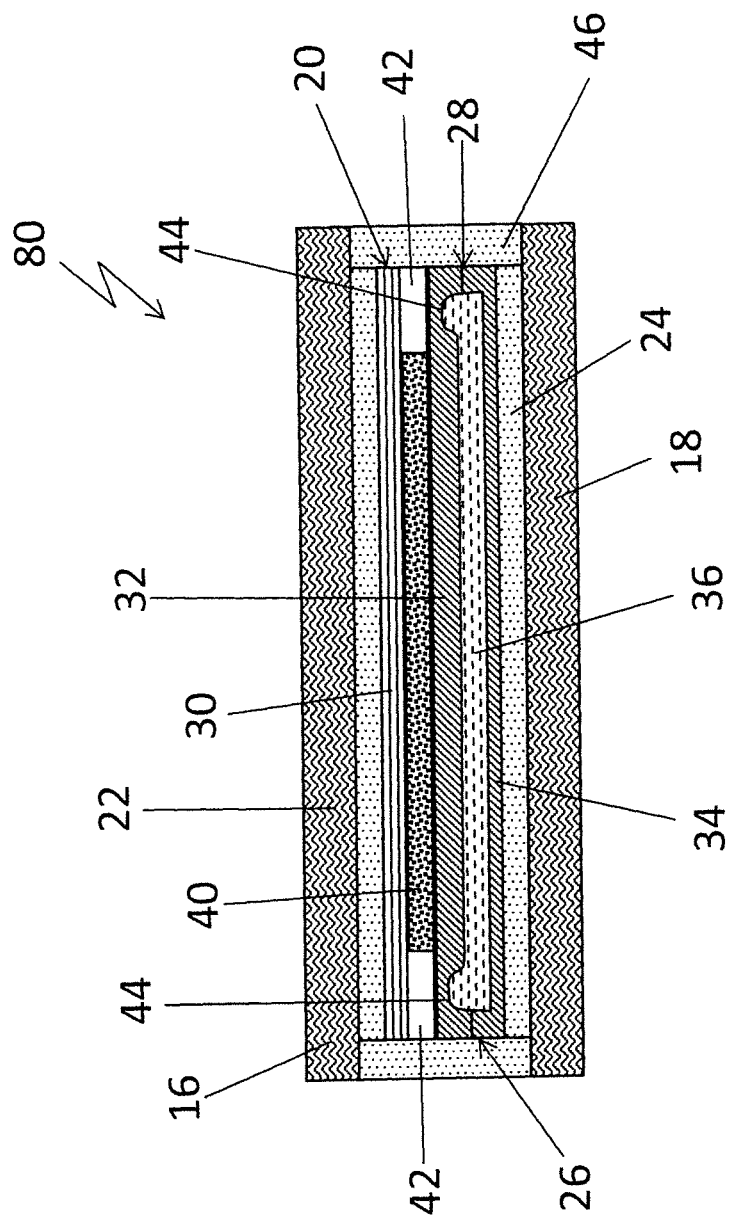
FIG. 6 is a section through a fifth embodiment of a vehicle window pane.

FIG. 6 shows another embodiment of a window pane arrangement 80, which substantially corresponds to the window pane arrangement of FIG. 5 but differs from it in that no additional adhesive layer is disposed between additional layer 40 disposed on top of liquid crystal arrangement 28 and polarizer layer 30. Instead, additional layer 40, whose area is smaller than that of polarizer layer 30 and of liquid crystal arrangement 28, forms a coupling layer between these two functional layers.

Figure 7:
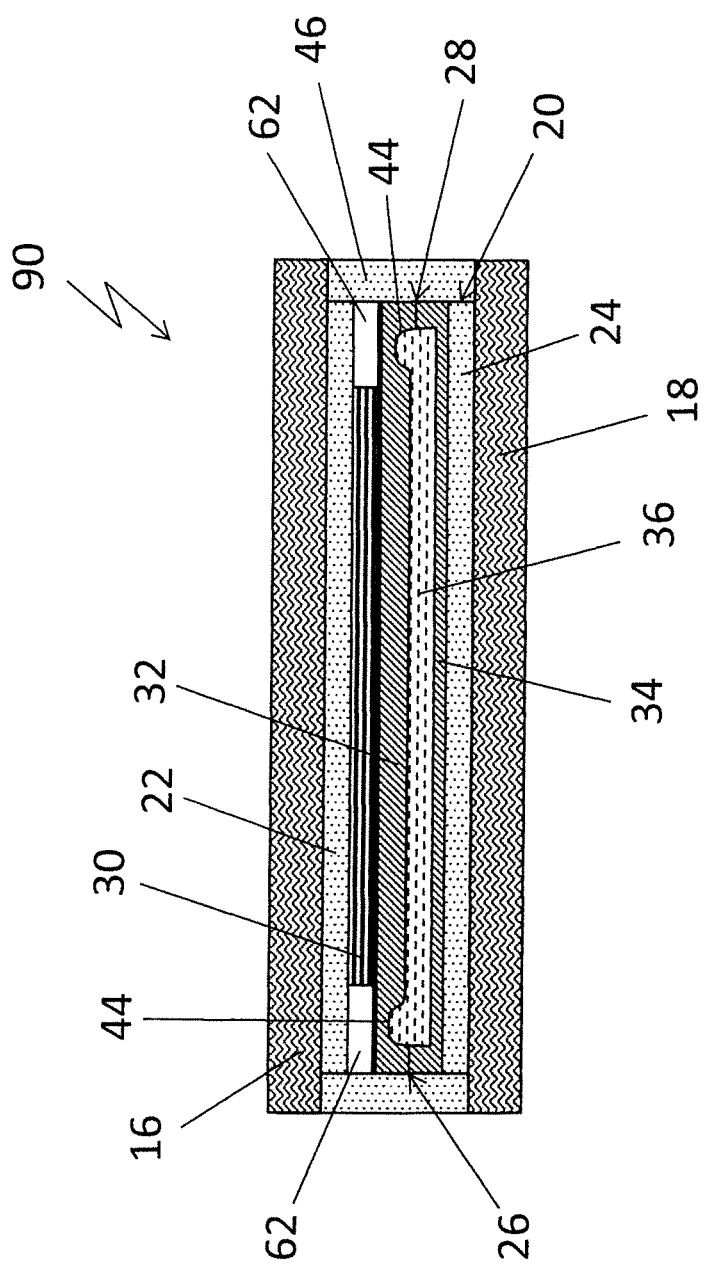
FIG. 7 is a section through a sixth embodiment of a vehicle window pane.

FIG. 7 shows another embodiment of a window pane arrangement 90, which largely corresponds to the window pane arrangement of FIG. 4 but differs from it in that it has no additional layer. Instead, polarizer layer 30 alone forms a displacement layer which causes the formation of liquid crystal reservoir 44.

Figure 8:
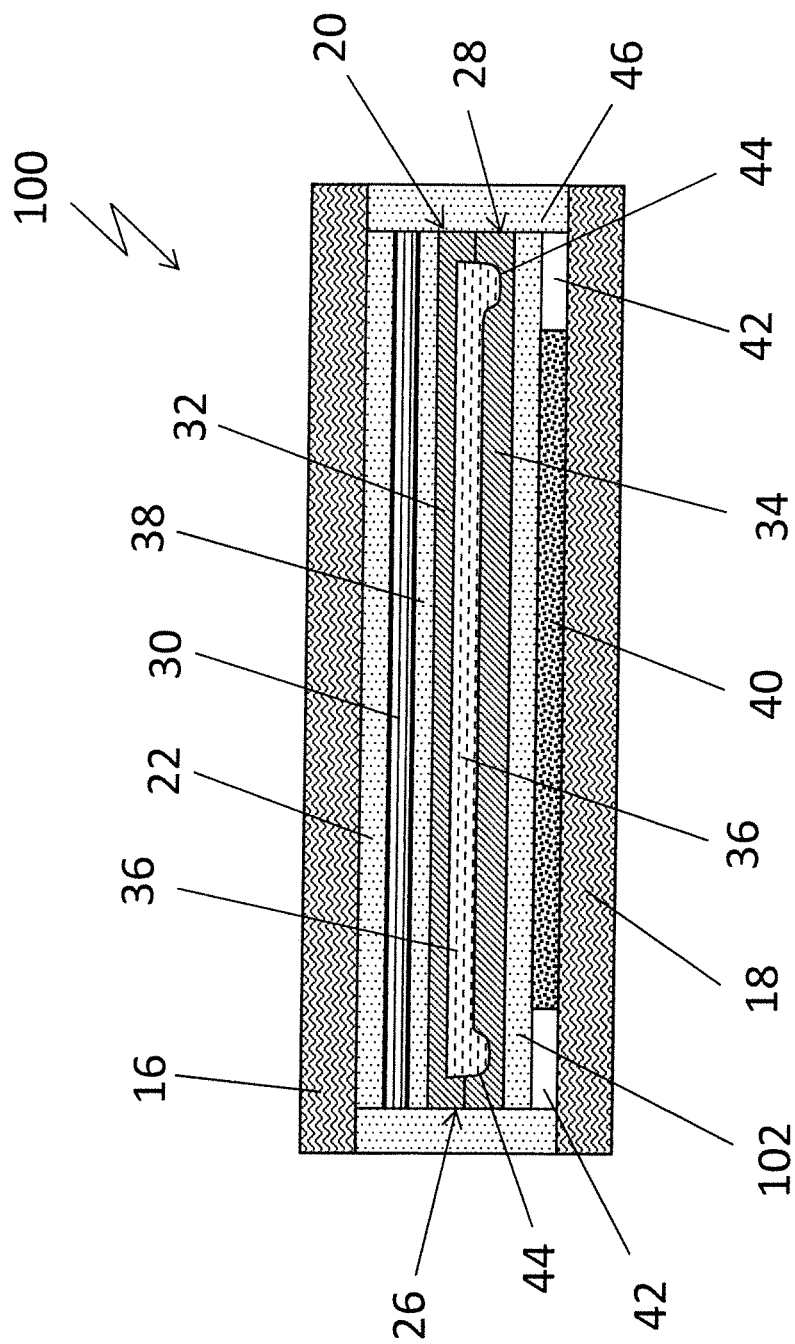
FIG. 8 is a section through a seventh embodiment of a vehicle window pane.

FIG. 8 shows a window pane arrangement 100 which largely corresponds to the window pane arrangement of FIG. 2 but differs from it in that additional layer 40 is adjacent to window pane inner body 18 instead of being directly adjacent to liquid crystal arrangement 28. Moreover, an adhesive layer 102 of thermoplastic polyurethane is disposed between additional layer 40 and liquid crystal arrangement 28. Similar to the embodiments described above, additional layer 40, which forms the displacement layer, is delimited by an empty space 42 which causes a liquid crystal reservoir 44 to form in the edge portion of liquid crystal cell 36 when composite 20 is joined. Otherwise, window pane arrangement 100 corresponds to the window pane arrangement of FIG. 2.

Figure 9:
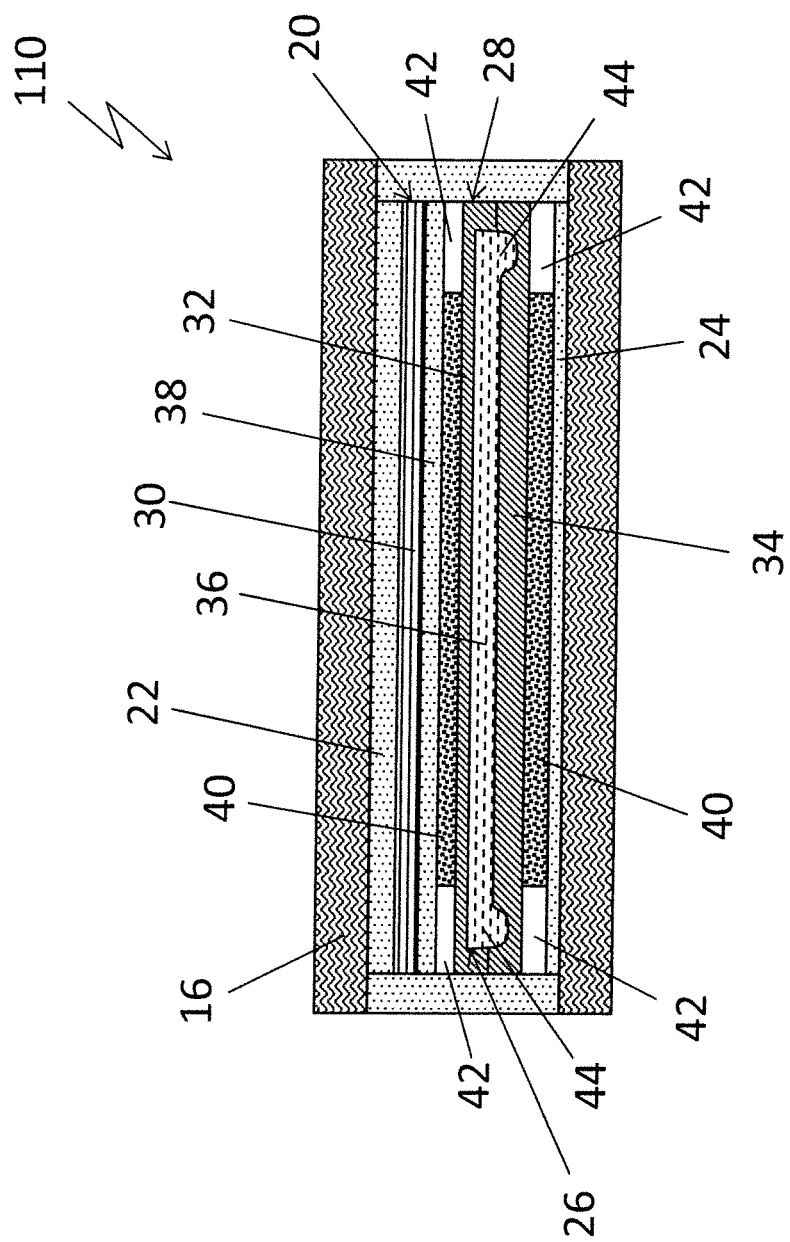
FIG. 9 is a section through an eighth embodiment of a vehicle window pane.

FIG. 9 shows a window pane arrangement 110 which is a combination of the window pane arrangements illustrated in FIGS. 2 and 5 and which has an additional layer 40 both underneath and on top of liquid crystal arrangement 28, additional layer 40 forming a displacement layer and being delimited by an empty space 42 which facilitates the formation of a thickened liquid crystal cell 36 in its edge portions, i.e., the formation of a liquid crystal reservoir 44 in the edge portions of liquid crystal cell 36 due to the pressure applied to a central portion by additional layers 40.

Otherwise, window pane arrangement 110 corresponds to the window pane arrangements of FIGS. 2 and 5.

Figure 10:
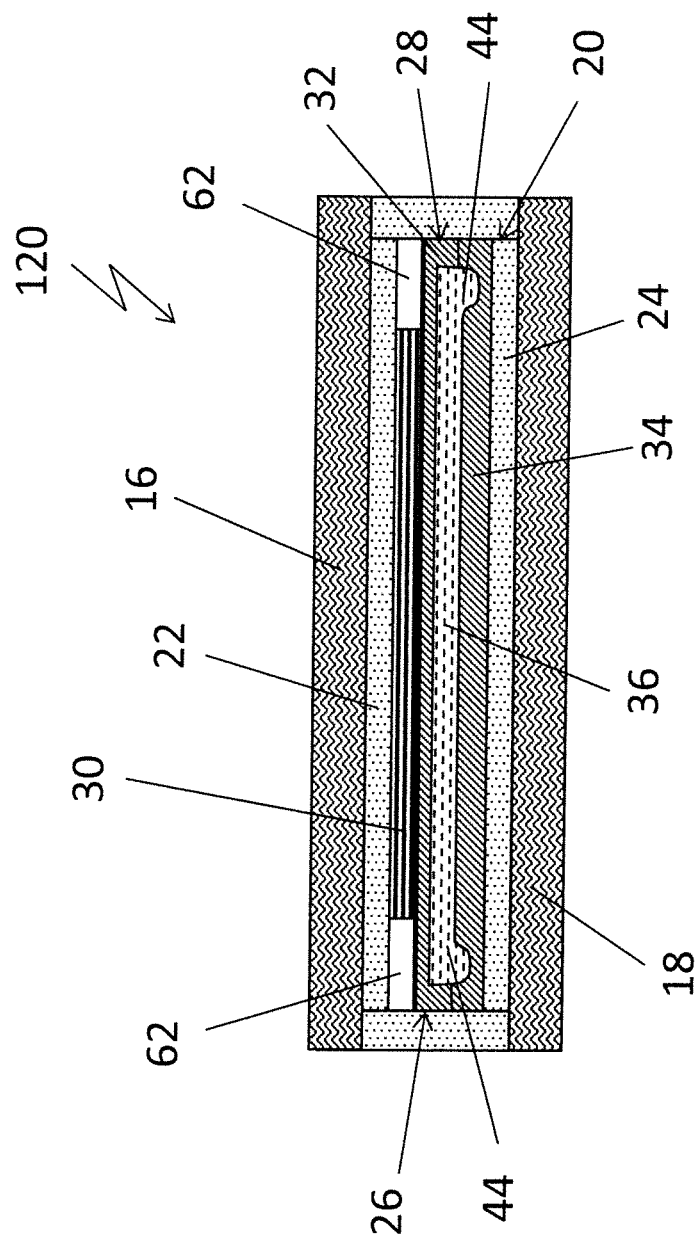
FIG. 10 is a section through a ninth embodiment of a vehicle window pane.

FIG. 10 shows another window pane arrangement 120, which largely corresponds to the embodiment of FIG. 7 but differs from it in that polarizer layer 30 is in direct contact with upper film 32 of liquid crystal arrangement 28. Again, polarizer layer 30 forms a displacement layer which, because its area is smaller than that of liquid crystal arrangement 28, is surrounded by an empty space 62 which causes a liquid crystal reservoir 44 to form in the edge portions of liquid crystal cell 36. Otherwise, window pane arrangement 120 corresponds to the window pane arrangement of FIG. 7.

Figure 11:
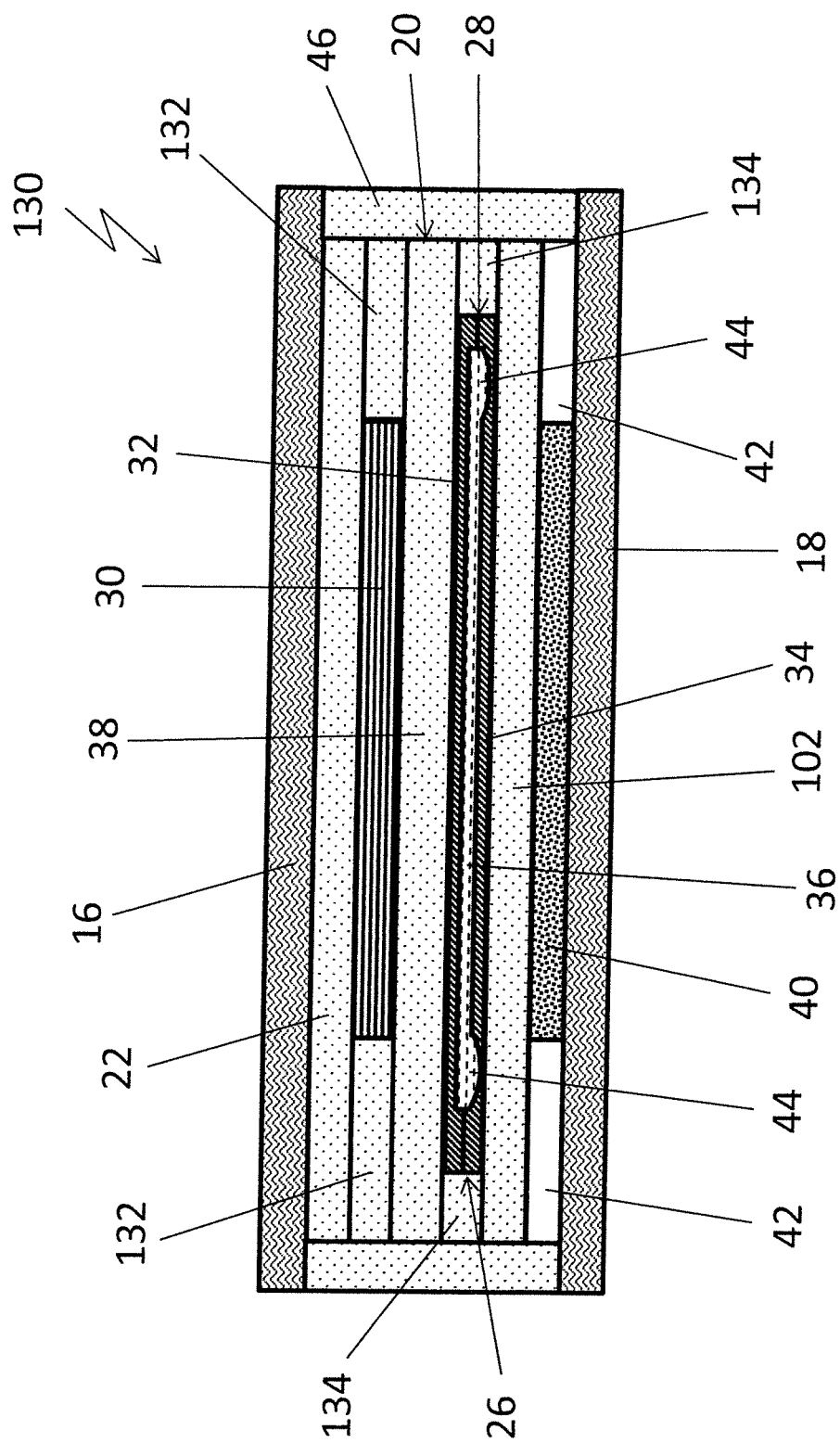
FIG. 11 is a section through a tenth embodiment of a vehicle window pane.

FIG. 11 shows a window pane arrangement 130 which largely corresponds to the embodiment of FIG. 8 but differs from it in that polarizer layer 30 has an area that is equal to the area of additional layer 40. A TPU adhesive film 132 is also disposed in the composite portions that are laterally adjacent to polarizer layer 30 and which are flush with empty space 42, which is adjacent to additional layer 40, in the direction of the normal. Moreover, liquid crystal arrangement 28 does not reach edge sealing 46. Instead, a circumferential strip 134 of TPU film is disposed between the lateral edges of liquid crystal arrangement 28 and edge sealing 46. Otherwise, window pane arrangement 130 corresponds to the window pane arrangement of FIG. 8, which is why reference is made to the description of the latter.

Figure 12:
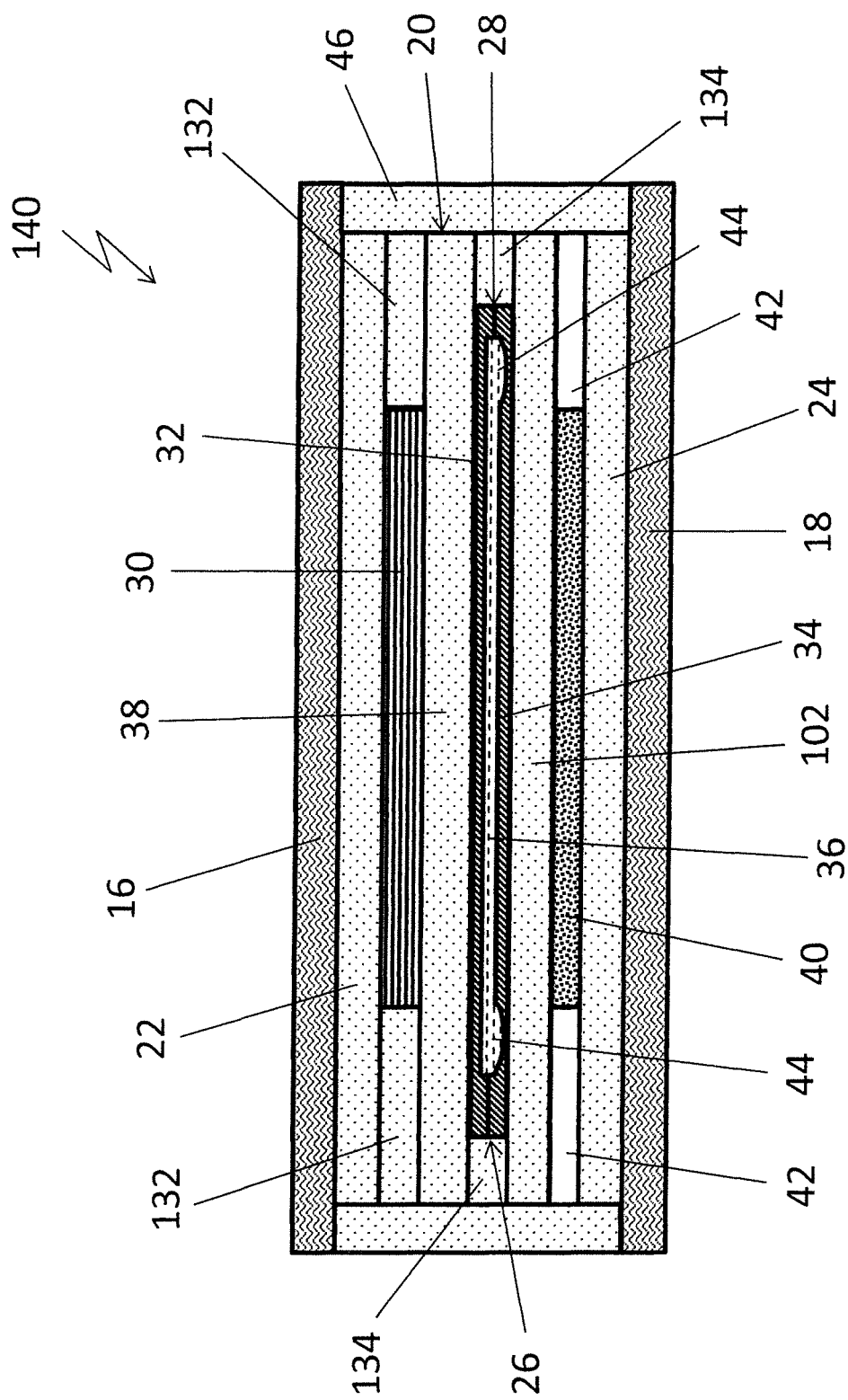
FIG. 12 is a section through an eleventh embodiment of a vehicle window pane.

FIG. 12 shows a window pane arrangement 140 which largely corresponds to the window pane arrangement of FIG. 11 but differs from it in that an adhesive film 24 is additionally disposed between adhesive layer 102 and window pane inner body 18, adhesive film 24 again being made of TPU. Otherwise, window pane arrangement 140 corresponds to the window pane arrangement of FIG. 11. That is, polarizer layer 30 has an area that is equal to the area of additional layer 40.

Figure 13:
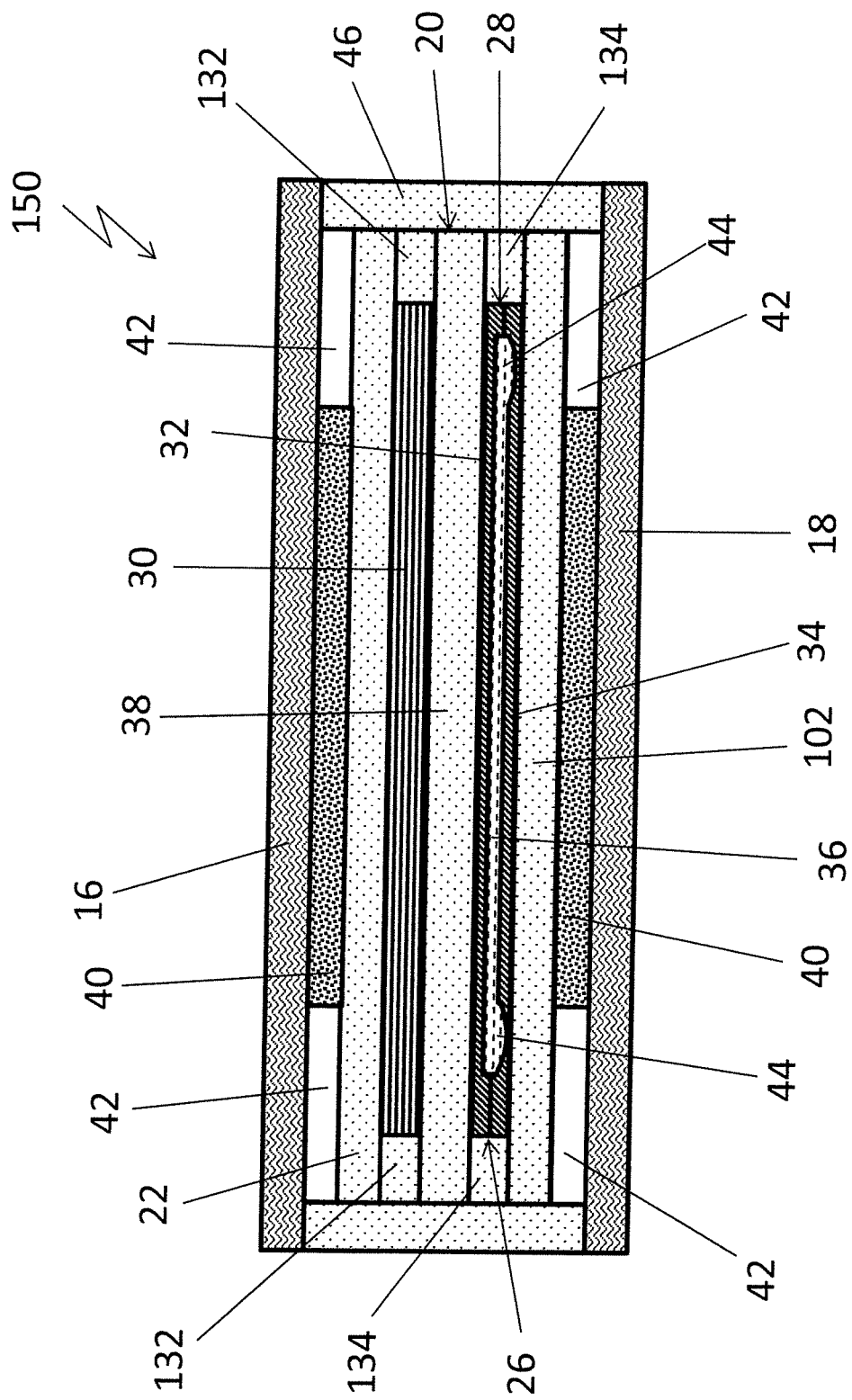
FIG. 13 is a section through a twelfth embodiment of a vehicle window pane.

FIG. 13 shows a window pane arrangement 150 which largely corresponds to the window pane arrangement of FIG. 11 but differs from it in that, like the embodiment of FIG. 9, it has a second additional layer 40, which, however, is disposed between adhesive film 22 (upper adhesive film in the drawing) and outer window pane body 16. Correspondingly, a lower or inner additional layer 40 is disposed between adhesive layer 102 and window pane inner body 18 and is directly adjacent to them. Upper/outer additional layer 40 is circumferentially delimited by an empty space 42 and has an area that is equal to the area of lower additional layer 40. Polarizer layer 30 has an area that is equal to the area of liquid crystal arrangement 28. Correspondingly, the circumferential edge of polarizer layer 30 is delimited by a TPU film 132. Otherwise, window pane arrangement 150 corresponds to the window pane arrangement of FIG. 11.

Figure 14:
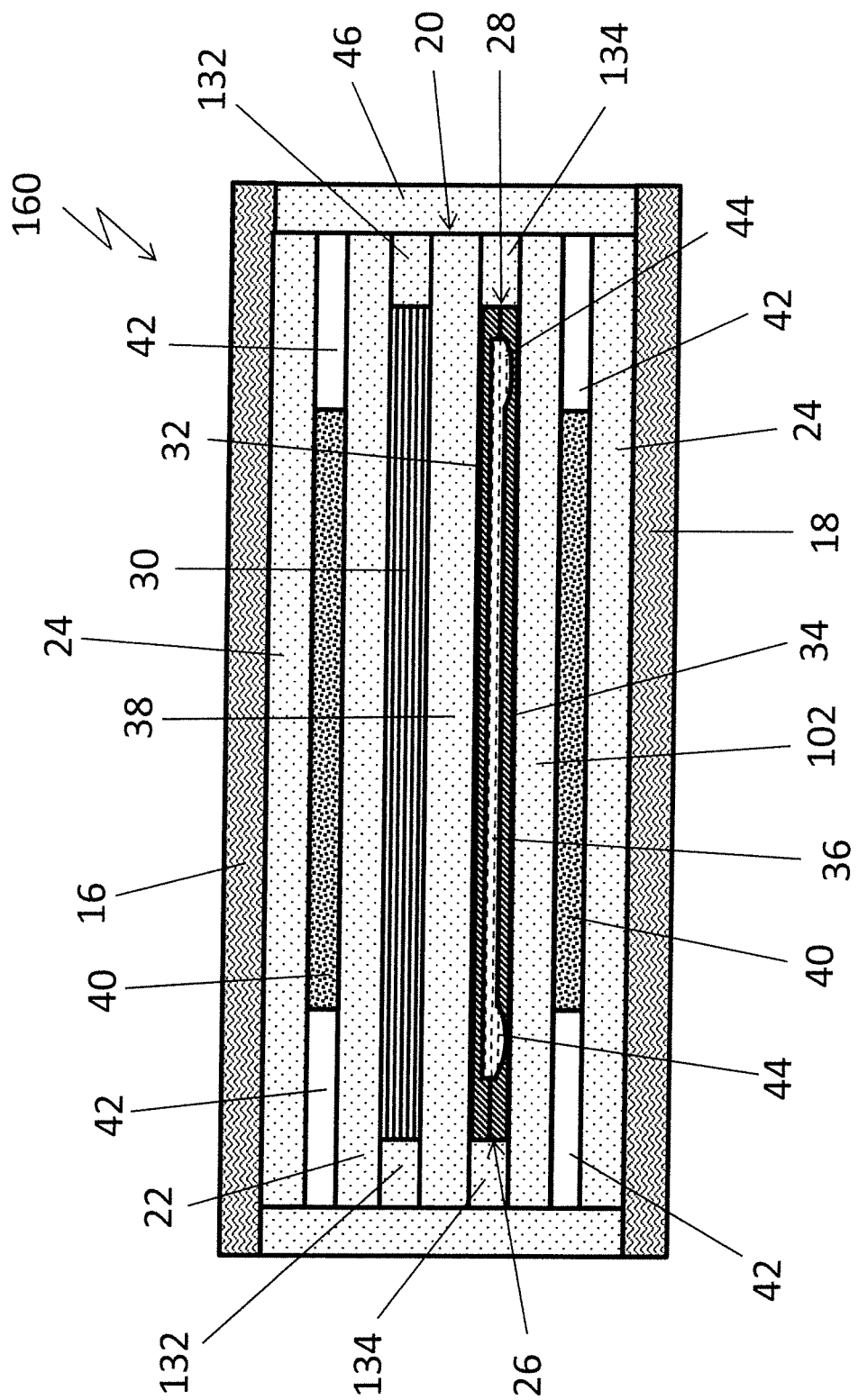
FIG. 14 is a section through a thirteenth embodiment of a vehicle window pane.

FIG. 14 shows a window pane arrangement 160 which largely corresponds to the embodiment of FIG. 13 but differs from it in that composite 20 has additional adhesive films 24 and 162 adjacent to outer window pane body 16 and adjacent to window pane inner body 18, respectively, adhesive films 24 and 162 being made of TPU and the inner sides of adhesive films 24 and 162, which face liquid crystal arrangement 28, being directly adjacent to respective additional layers 40, which are displacement layers. Otherwise, the structure of window pane arrangement 160 corresponds to the structure of FIG. 13.

REFERENCE SIGNS 10 vehicle roof
12 lid
14 fixed roof element
16 window pane body
18 window pane inner body
20 composite
22 adhesive film
24 adhesive film
26 shading arrangement
28 liquid crystal arrangement
30 polarizer layer
32 film
34 film
36 liquid crystal cell
38 adhesive layer
40 additional layer
42 empty space
44 liquid crystal reservoir
46 edge sealing
50 window pane arrangement
52 decoupling layer
60 window pane arrangement
62 empty space
70 window pane arrangement
80 window pane arrangement
90 window pane arrangement
100 window pane arrangement
102 adhesive layer
110 window pane arrangement
120 window pane arrangement
130 window pane arrangement
132 TPU film
134 strip
140 window pane arrangement 150 window pane arrangement
160 window pane arrangement
162 adhesive film

The invention claimed is:

1. A vehicle window pane comprising:
a plate-like window pane body which has an outer side which faces the surroundings of the vehicle and an inner side which faces away tram the outer side and to which a composite is connected,
the composite having a layer structure which comprises multiple layers disposed one on top of the other,
one of the layers comprising a liquid crystal arrangement which comprises two films and a liquid crystal cell disposed between the two films, and another one of the layers being a polarizer layer,
wherein at least one layer of the layer structure is a displacement layer whose area is smaller than the area of the liquid crystal arrangement, the liquid crystal cell thus having an edge portion which is thicker than a central portion covered by the displacement layer due to the pressure applied to the central portion by the displacement layer, and the edge portion is not covered by the displacement layer.

2. The vehicle window pane of claim 1, wherein the displacement layer is formed by the polarizer layer.

3. The vehicle window pane of claim 1, wherein the displacement layer is formed by an additional film.

4. The vehicle window pane of claim 3, wherein the additional layer is adjacent to the liquid crystal arrangement.

5. The vehicle window pane of claim 3, wherein the additional layer is adjacent to the polarizer layer.

6. The vehicle window pane of claim 3, wherein the additional layer is disposed between the liquid crystal arrangement and the polarizer layer.

7. The vehicle window pane of claim 3, wherein the additional layer has a thickness between 10 µm and 500 µm.

8. The vehicle window pane of claim 3, wherein a window pane inner body is glued to the layer structure.

9. The vehicle window pane of claim 8, wherein the additional layer is adjacent to the window pane inner body.

10. The vehicle window pane of claim 1, wherein the layer structure comprises an adhesive layer for being connected to the window pane body.

11. The vehicle window pane of claim 1, wherein the layer structure comprises an adhesive layer between the liquid crystal arrangement and the polarizer layer.

12. The vehicle window pane of claim 10, wherein the adhesive layer is made of at least one of a layer selected from the group consisting of an acrylate layer, a layer of thermoplastic polyurethane, an epoxy layer, a silicone layer, a polyethylene layer and a layer of a cross-linking material, such as ethylene-vinyl acetate (EVA) or polyvinyl butyral (PVB).

13. The vehicle window pane of claim 3, wherein the additional layer is made of at least one of a layer selected from the group consisting of an acrylate layer, a layer of thermoplastic polyurethane, an epoxy layer, a silicone layer, a polyethylene layer, a layer of a cross-linking material such as ethylene-vinyl acetate (EVA) or polyvinyl butyral (PVB), and a transparent plastic film, which consists of one of a polyethylene terephthalate (PET), polycarbonate (PC) or a cyclic olefin copolymer (COC).

14. The vehicle window pane of claim 1, wherein the edge portion of the liquid crystal cell has a width between 5 mm and 40 mm.

15. The vehicle window pane of claim 1, wherein the layer structure has a circumferential edge which is surrounded by an edge sealing, which consists a film structure.

* * * * *